United States Patent
Matsubara et al.

(10) Patent No.: US 11,150,827 B2
(45) Date of Patent: Oct. 19, 2021

(54) STORAGE SYSTEM AND DUPLICATE DATA MANAGEMENT METHOD

(71) Applicant: HITACHI, LTD., Tokyo (JP)

(72) Inventors: Kazumasa Matsubara, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/009,033

(22) Filed: Sep. 1, 2020

(65) Prior Publication Data

US 2021/0255790 A1 Aug. 19, 2021

(30) Foreign Application Priority Data

Feb. 13, 2020 (JP) .............................. JP2020-022452

(51) Int. Cl.
*G06F 3/06* (2006.01)

(52) U.S. Cl.
CPC .......... *G06F 3/0641* (2013.01); *G06F 3/0608* (2013.01); *G06F 3/068* (2013.01); *G06F 3/0647* (2013.01)

(58) Field of Classification Search
None
See application file for complete search history.

(56) References Cited

U.S. PATENT DOCUMENTS

| 10,303,365 | B1 * | 5/2019 | Wu ....................... G06F 3/0641 |
| 2013/0086006 | A1 * | 4/2013 | Colgrove ............ G06F 16/1752 707/692 |
| 2013/0097380 | A1 * | 4/2013 | Colgrove .............. G06F 3/0641 711/118 |
| 2013/0326115 | A1 | 12/2013 | Goss et al. |
| 2018/0210659 | A1 * | 7/2018 | Malladi ................. G06F 12/023 |

* cited by examiner

*Primary Examiner* — Michael Alsip
(74) *Attorney, Agent, or Firm* — Procopio, Cory, Hargreaves & Savitch LLP

(57) ABSTRACT

When the hash of the divided data is not duplicate with the hash registered in an in-memory hash table, the hash of the divided data is registered in the in-memory non-duplication data list. When the hash registered in the in-memory non-duplication data list is duplicated with the hash registered in an on-disk hash table, a duplicate count of the duplicate hash registered in the on-disk hash table is increased by 1 and an update time of the hash is updated to the latest value. When the duplication count of the hash registered in the on-disk hash table exceeds a threshold, the hash which is registered in the on-disk hash table and in which the duplication count has exceeded the threshold is moved from the on-disk hash table to the in-memory hash table.

6 Claims, 15 Drawing Sheets

FIG. 3

| 501 HASH VALUE | 502 PATH | 503 DUPLICATE DATA OFFSET | 504 SIZE | 505 UPDATE TIME | 506 REFERENCE COUNT |
|---|---|---|---|---|---|
| | | | | | |
| ⋮ | | ⋮ | ⋮ | ⋮ | ⋮ |
| | | | | | |

| SETTING | VALUE |
|---|---|
| ENTRY (CAPACITY) UPPER LIMIT OF IN-MEMORY HASH TABLE | 1000 |
| ENTRY (CAPACITY) UPPER LIMIT OF ON-DISK HASH TABLE | 10000 |
| DUPLICATION COUNT THRESHOLD | 3 |
| DEDUPLICATION EXCLUDED TARGET | .mp4 .pdf |

FIG. 5

| 701 | 702 | 703 | 704 | 705 | 706 |
|---|---|---|---|---|---|
| HASH VALUE | PATH | DUPLICATE DATA OFFSET | SIZE | UPDATE TIME | REFERENCE COUNT |
| ⋮ | | ⋮ | ⋮ | ⋮ | ⋮ |

| PATH (801) | OFFSET (802) | SIZE (803) | HASH VALUE (804) | UPDATE TIME (805) |
|---|---|---|---|---|
|  |  |  |  |  |
|  |  |  |  |  |
| ... | ... | ... | ... | ... |
|  |  |  |  |  |

| PATH (901) | OFFSET (902) | DUPLICATE DATA OFFSET (903) | SIZE (904) |
|---|---|---|---|
|  |  |  |  |
|  |  |  |  |
| ... | ... | ... | ... |
|  |  |  |  |

STORAGE SYSTEM AND DUPLICATE DATA MANAGEMENT METHOD

BACKGROUND OF THE INVENTION

1. Field of the Invention

The present invention relates to a storage system and a duplicate data management method.

2. Description of the Related Art

In order to reduce a data storage cost, a capacity reduction technology such as data deduplication is required. In the data deduplication, a duplication determination process causes a large number of I/O requests, resulting in a heavy system load and a decrease in performance. Therefore, US 2013/326115 B discloses a method of arranging duplication determination information (hash table) only on a memory to speed up the duplication determination process.

SUMMARY OF THE INVENTION

However, since the memory capacity is finite, not all hashes can be held in the memory. Therefore, if a new (non-duplicate) hash is continuously added to the hash table, the hash table on the memory is filled with the new hash, and the registered hash is deleted. Since it is not known whether the new hash will be duplicated in the future, the hash table may be filled with a hash that is difficult to duplicate, resulting in a decrease in a deduplication rate.

The invention has been made in view of the above circumstances, and an object thereof is to provide a storage system and a duplicate data management method for a storage system capable of suppressing a decrease in the deduplication rate while coping with the limitation of the memory capacity.

In order to achieve the above object, a storage system according to one aspect includes a processor, a drive that stores data, and a memory that is capable of inputting and outputting faster than the drive. The storage system has a deduplication function of deduplicating a plurality of pieces of the same data determined to be duplicated in duplication determination to store the data in the drive. Hashes calculated from the data are compared, and the data whose hashes are matched is compared to perform the duplication determination. The hashes calculated from the data is stored at least in any one of the memory and the drive using both storage areas of the memory and the drive. A hash of data for the duplication determination is compared with a plurality of hashes stored in the memory and/or the drive. The hash is moved between the memory and the drive based on the number of times that the hashes are matched in the duplication determination.

According to the invention, it is possible to suppress a decrease in a deduplication rate while coping with the limitation of a memory capacity.

BRIEF DESCRIPTION OF THE DRAWINGS

FIG. 3 is a diagram illustrating a configuration example of an in-memory hash table of FIG. 2;

FIG. 4 is a diagram illustrating a configuration example of a deduplication setting table in FIG. 2;

FIG. 5 is a diagram illustrating a configuration example of an on-disk hash table in FIG. 2;

FIG. 6 is a diagram illustrating a configuration example of an in-memory non-duplication data list of FIG. 2;

FIG. 7 is a diagram illustrating a configuration example of a file configuration management table of FIG. 2;

DESCRIPTION OF THE PREFERRED EMBODIMENTS

Embodiments will be described with reference to the drawings. Further, the embodiments described below do not limit the scope of the invention. Not all the elements and combinations thereof described in the embodiments are essential to the solution of the invention.

In the following description, the process may be described with the "program" as the subject, but the program is executed by a processor (for example, a CPU (Central Processing Unit)) to appropriately perform the determined process while using a storage resource (for example, a memory) and/or a communication interface device (for example, a port). Therefore, the subject of the process may be the program. The process described with the program as the subject may be a process performed by a processor or a computer having the processor.

Figure 1:
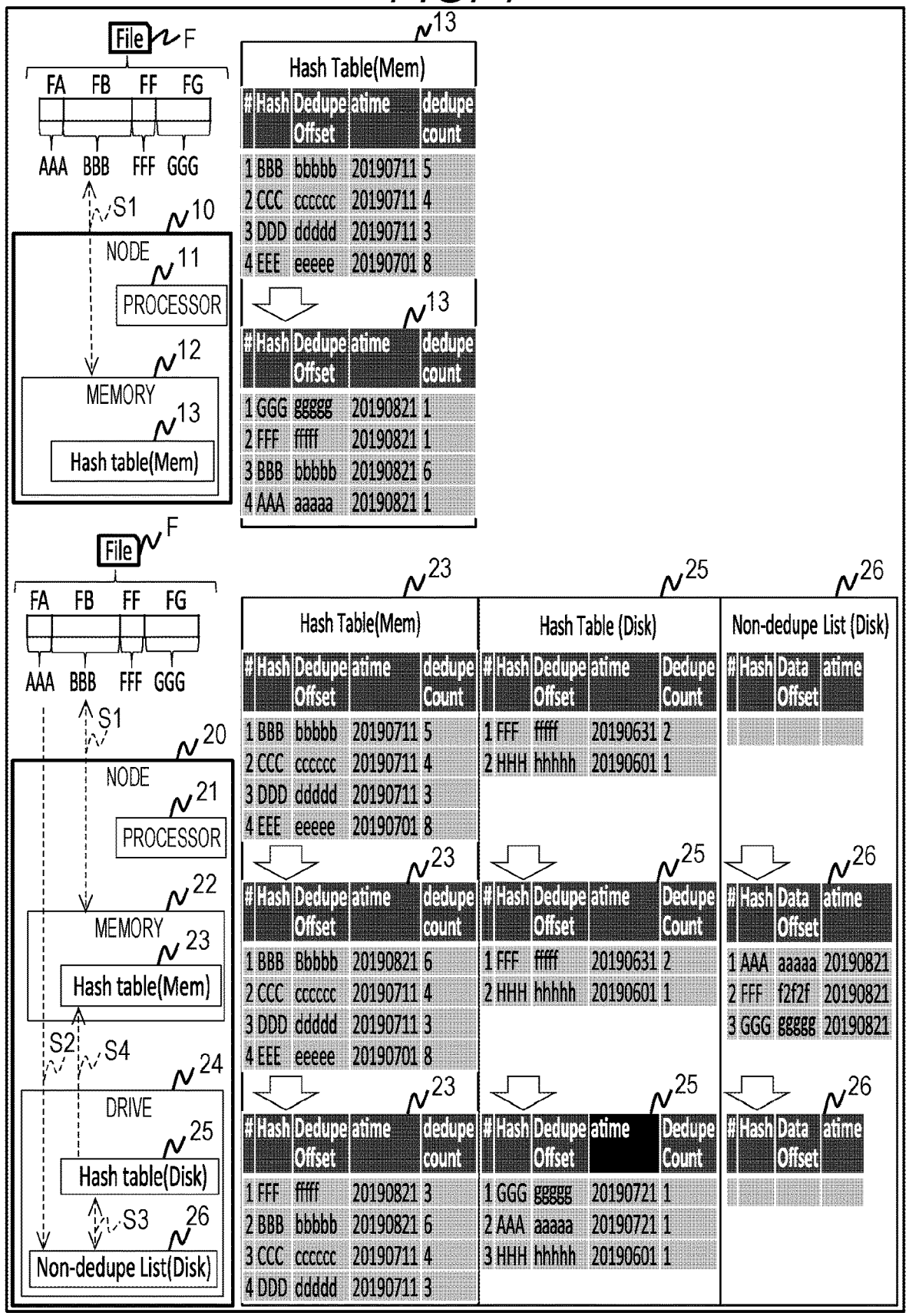
FIG. 1 is a diagram illustrating an example of a duplicate data management method of a storage system according to a first embodiment in comparison with a comparative example.

FIG. 1 is a diagram illustrating an example of a duplicate data management method of a storage system according to a first embodiment in comparison with a comparative example. In FIG. 1, the comparative example includes a storage node 10. The storage node 10 includes a processor 11 and a memory 12. The memory 12 holds an in-memory hash table 13.

The in-memory hash table 13 includes entries of #, Hash, Dedupe Offset, atime, and dedupe count. An entry number is recorded in #. The hash of the divided data obtained by dividing a file is recorded in Hash. The divided data is a unit for calculating a hash. In Dedupe Offset, an offset value of duplicate divided data is recorded. The update time of the divided data is recorded in atime. A duplication count of the divided data is recorded in the dedupe count.

Then, the processor 11 receives the write request of a file F, calculates hashes AAA, BBB, FFF, and GGG of each divided data FA, FB, FF, and FG of the file F, and compares the hashes with the hashes BBB, CCC, DDD, and EEE registered in the in-memory hash table 13 (S1).

Here, since the hash BBB of the divided data FB is duplicate with the hash BBB registered in the in-memory hash table 13, the processor 11 increases the duplication count of the hash BBB by 1. On the other hand, the hashes AAA, FFF, and GGG of the divided data FA, FF, and FG are not duplicate with the hashes BBB, CCC, DDD, and EEE registered in the in-memory hash table 13, so the processor 11 registers the hashes AAA, FFF, and GGG in the in-memory hash table 13.

Here, assuming that the entries that can be recorded in the in-memory hash table 13 are limited to 4 entries due to the capacity limitation of the memory 12, the entries of the hashes CCC, DDD, and EEE are deleted from the in-memory hash table 13, and the entries for registering the hashes AAA, FFF, and GGG are secured in the in-memory hash table 13.

At this time, the duplication count of each of the hashes AAA, FFF, and GGG registered in the in-memory hash table 13 is set to 1. Therefore, if new hashes are continuously added to the in-memory hash table 13, the in-memory hash table 13 is filled with new hashes, and the registered hashes are deleted. Since it is not known whether the new hash will be duplicated in the future, the in-memory hash table 13 is filled with a hash that is difficult to duplicate, resulting in a reduction in the deduplication rate.

On the other hand, in this embodiment, a storage node 20 is provided. The storage node 20 includes a processor 21, a memory 22, and a drive 24. The memory 12 may be configured by, for example, a semiconductor memory such as an SRAM (Static Random Access Memory) or a DRAM (Dynamic Random Access Memory). The drive 24 is, for example, a hard disk device or an SSD (Solid State Drive). The drive 24 can have a larger capacity than the memory 22. The processor 21 can access the memory 22 faster than the drive 24.

The processor 21 may be a CPU or a GPU (Graphics Processing Unit). The processor 21 may be a single core processor or a multi core processor. In addition, the processor 21 may be provided with a hardware circuit such as an accelerator which performs a part of processes (for example, FPGA (Field-Programmable Gate Array) or an ASIC (Application Specific Integrated Circuit)).

The memory 22 holds an in-memory hash table 23. The drive 24 holds an on-disk hash table 25 and an in-memory non-duplication data list 26. The in-memory hash table 23 includes the same entries as the in-memory hash table 13. The on-disk hash table 25 includes entries of #, Hash, Dedupe Offset, atime, and dedupe count. The in-memory non-duplication data list 26 includes entries of #, Hash, Dedupe Offset, and atime.

Then, the processor 21 receives the write request of a file F, calculates hashes AAA, BBB, FFF, and GGG of the respective divided data FA, FB, FF, and FG of the file F, and compares the hashes with the hashes BBB, CCC, DDD, and EEE registered in the in-memory hash table 23 (S1).

Here, since the hash BBB of the divided data FB is duplicate with the hash BBB registered in the in-memory hash table 23, the processor 21 increases the duplication count of the hash BBB by 1 in the in-memory hash table 23. At the same time, the update time of the hash BBB is updated to the latest value. On the other hand, the hashes AAA, FFF, and GGG of the divided data FA, FF, and FG are not duplicate with the hashes BBB, CCC, DDD, and EEE registered in the in-memory hash table 23. Therefore, the processor 21 registers those hashes AAA, FFF, and GGG in the in-memory non-duplication data list 26 (S2).

Here, if the hashes AAA, FFF, and GGG of the divided data FA, FF, FG are not duplicate with the hashes BBB, CCC, DDD, and EEE registered in the in-memory hash table 23, it is possible to prevent the in-memory hash table 23 from being filled with new hashes by registering the hashes AAA, FFF, and GGG in the in-memory non-duplication data list 26 instead of registering those hashes in the in-memory hash table 23.

Next, the processor 21 compares the hashes AAA, FFF, and GGG registered in the in-memory non-duplication data list 26 with the hashes FFF and HHH registered in the on-disk hash table 25 (S3). The processor 21 can execute the comparison of S3 asynchronously with the comparison of S1.

Here, since the hash FFF registered in the in-memory non-duplication data list 26 is duplicate with the hash FFF registered in the on-disk hash table 25, the processor 21 increases the duplication count of the hash FFF by 1 in the on-disk hash table 25. When the duplication count of the hash registered in the on-disk hash table 25 exceeds a threshold, the processor 21 moves the hash of which the duplication count registered in the on-disk hash table 25 exceeds the threshold from the on-disk hash table 25 to the in-memory hash table 23 (S4). For example, assuming that this threshold is 2, the hash FFF duplication count=3 registered in the on-disk hash table 25 exceeds the threshold=2, so the processor 21 moves the hash FFF from the on-disk hash table 25 to the in-memory hash table 23, and updates the update time of the hash FFF to the latest value.

Here, assuming that the number of entries that can be recorded in the in-memory hash table 23 is limited to 4 entries due to the restriction of the capacity of the memory 22, the processor 21 deletes the entry having the hash EEE with the oldest update time from the in-memory hash table 23, and secures the entry for registering the hash FFF in the in-memory hash table 23. At this time, the processor 21 selects an entry having the hash EEE to be deleted from the in-memory hash table 23 without referring to the duplication count of the hashes BBB, CCC, DDD, and EEE registered in the in-memory hash table 23. Therefore, in the example of FIG. 1, the entry having the hash EEE with the largest duplication count is deleted from the in-memory hash table 23.

Here, the hash EEE has the largest duplication count but the oldest update time. For this reason, the hash EEE has been duplicated many times before, but it is unknown whether the hash will be duplicated in the future. On the other hand, the hashes FFF, BBB, CCC, and DDD left in the in-memory hash table 23 have newer update times than the hash EEE, and the number of updates exceeds the threshold. Therefore, the hashes FFF, BBB, CCC, and DDD left in the in-memory hash table 23 are more likely to be duplicate than the hash EEE. As a result, the storage node 20 can suppress the decrease in the deduplication rate while coping with the restriction of the capacity of the memory 22.

On the other hand, the hashes AAA and GGG registered in the in-memory non-duplication data list 26 is not duplicate with the hashes FFF and HHH registered in the on-disk hash table 25, so the processor 21 moves the hashes AAA and GGG registered in the list 26 to the on-disk hash table 25.

Figure 2:
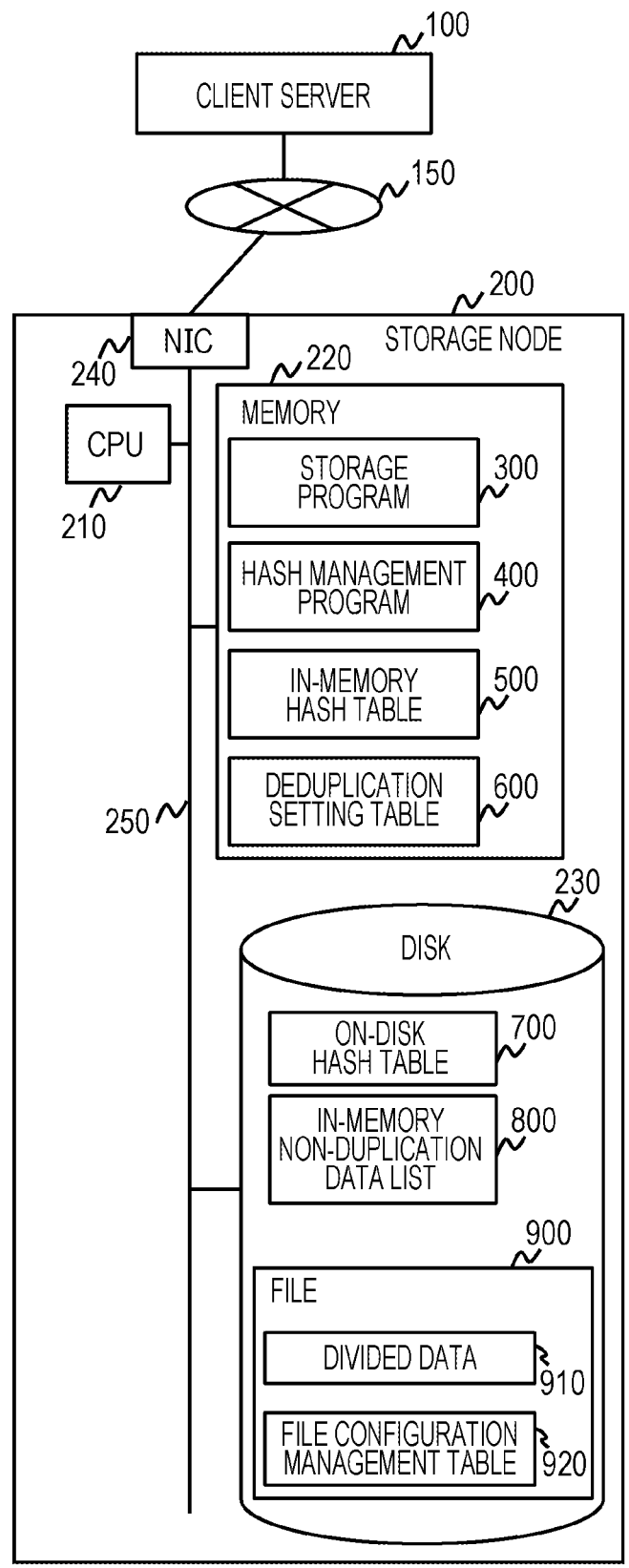
FIG. 2 is a block diagram illustrating an example of a hardware configuration of the storage system according to the first embodiment.

FIG. 2 is a block diagram illustrating an example of the hardware configuration of the storage system according to the first embodiment.

In FIG. 2, the storage system includes a client server 100 and the storage node 200. The client server 100 and the storage node 200 are connected via a network 150.

The client server 100 is, for example, a host that executes an IO request (data read request or data write request) to the storage node 200. The storage node 200 performs IO processing in response to the IO request from the client server 100. At this time, the storage node 200 provides the capacity to the client server 100 via the network 150.

The storage node 200 includes a CPU 210, a memory 220, a disk 230, and a NIC (Network Interface Card) 240. The CPU 210, the memory 220, the disk 230, and the NIC 240 are connected to each other via a bus 250.

The memory 220 is a main storage device that can be read and written by the CPU 210. The memory 220 is, for example, a semiconductor memory such as SRAM or DRAM. The memory 220 can be provided with a work area which is used by the CPU 210 to store a program being executed or for the CPU 210 to execute a program.

The memory 220 holds a storage program 300, a hash management program 400, an in-memory hash table 500, and a deduplication setting table 600.

The storage program 300 manages the file 900 stored in the disk 230. The hash management program 400 manages the in-memory hash table 500, an in-memory non-duplication data list 800, and an on-disk hash table 700. The in-memory hash table 500 registers the hash of the divided data 910 stored in the disk 230, the duplication count of the hash, and the update time of the hash. The deduplication setting table 600 sets values used for updating the in-memory hash table 500 and the on-disk hash table 700.

The disk 230 is a secondary storage device that can be read and written by the CPU 210. The disk 230 is, for example, a hard disk device or an SSD (Solid State Drive). The disk 230 can hold execution files for various programs and data used for executing the programs.

The disk 230 holds the on-disk hash table 700, the in-memory non-duplication data list 800, and the file 900. The file 900 is divided into the divided data 910, and the disk 230 holds a file configuration management table 920 for each divided data 910.

The on-disk hash table 700 registers the hash of the divided data 910 stored in the disk 230, the duplication count of the hash, and the update time of the hash. The in-memory non-duplication data list 800 registers the hash of the divided data 910 stored in the disk 230 and the update time of the hash. A file configuration management table 920 manages the configuration of the divided data 910.

The CPU 210 reads the storage program 300 and the hash management program 400 onto the memory 220 and executes the programs. The CPU 210 is connected to the NIC 240 via the bus 250 and can send and receive data to and from the client server 100.

Upon receiving the write request from the client server 100, the CPU 210 generates the divided data obtained by dividing the file, calculates the hash of each divided data, and compares the hash with the hash registered in the in-memory hash table 500. Then, when the hash of the divided data at this time is not duplicate with the hash registered in the in-memory hash table 500, the CPU 210 registers the hash of the divided data at this time in the in-memory non-duplication data list 800.

Further, the CPU 210 executes the following process asynchronously with the above process.

That is, the CPU 210 compares the hash registered in the in-memory non-duplication data list 800 with the hash registered in the on-disk hash table 700. When the hash registered in the in-memory non-duplication data list 800 is duplicate with the hash registered in the on-disk hash table 700, the duplication count of the duplicated hash registered in the on-disk hash table 700 is increased by 1, and the update time of the hash is updated to the latest value.

Then, when the duplication count of the hash registered in the on-disk hash table 700 exceeds the threshold, the CPU 210 moves the hash, which is registered in the on-disk hash table 700 and in which the duplication count has exceeded the threshold, from the on-disk hash table 700 to the in-memory hash table 500, and updates the update time of the hash to the latest value.

On the other hand, when the hash registered in the in-memory non-duplication data list 800 is not duplicate with the hash registered in the on-disk hash table 700, the CPU 210 moves the hash, which is not duplicate with the hash registered in the on-disk hash table 700, from the in-memory non-duplication data list 800 to the on-disk hash table 700.

This prevents the in-memory hash table 500 from being filled with new hashes, and it is possible to leave the hashes that are highly likely to be duplicated in the future in the in-memory hash table 500, and it is possible to suppress a decrease in the deduplication rate while coping with the restriction of the capacity of the memory 220.

FIG. 3 is a diagram illustrating a configuration example of the in-memory hash table of FIG. 2.

In FIG. 3, the in-memory hash table 500 includes entries of a hash value 501, a path 502, a duplicate data offset 503, a size 504, an update time 505, and a reference count 506.

In the hash value 501, the hash of the divided data 910 written in the file 900 on the disk 230 of FIG. 2 is recorded. In the path 502, the path on the disk 230 of the file 900 that stores the divided data 910 is recorded. Further, the path 502 may be omitted if the storage location of the duplicate data can be specified by the duplicate data offset 503. In the duplicate data offset 503, the offset value of the portion that stores the duplicated divided data 910 in the file 900 storing the divided data 910 is recorded. The size of the divided data 910 is recorded in the size 504. The update time 505 records the update time of the hash. The reference count 506 records the duplication count of the hash.

FIG. 4 is a diagram illustrating a configuration example of the deduplication setting table in FIG. 2.

In FIG. 4, the deduplication setting table 600 includes entries of an entry upper limit 601 of the in-memory hash table 500, an entry upper limit 602 of the on-disk hash table 700, a duplication count threshold 603, and a deduplication excluded target 604.

The upper limit number of entries of the in-memory hash table 500 is recorded in the entry upper limit 601 of the in-memory hash table 500. The memory capacity may be set instead of the number of entries. The upper limit number of entries of the on-disk hash table 700 is recorded in the entry upper limit 602 of the on-disk hash table 700. The disk capacity may be set instead of the number of entries. In the duplication count threshold 603, a threshold of the duplication count of the hash to be moved from the on-disk hash table 700 to the in-memory hash table 500 is recorded. In the deduplication excluded target 604, files that are not the deduplication target are recorded. The files not subject to deduplication are, for example, moving image files.

FIG. 5 is a diagram illustrating a configuration example of the on-disk hash table in FIG. 2.

In FIG. 5, the on-disk hash table 700 includes entries of a hash value 701, a path 702, a duplicate data offset 703, a size 704, an update time 705, and a reference count 706.

In the hash value 701, the hash of the divided data 910 written in the file 900 on the disk 230 of FIG. 2 is recorded. In the path 702, the path on the disk 230 of the file 900 that stores the divided data 910 is recorded. Further, the path 702 may be omitted if the storage location of the duplicate data can be specified by the duplicate data offset 703. In the duplicate data offset 703, the offset value of the portion that stores the duplicated divided data 910 in the file 900 storing the divided data 910 is recorded. In the size 704, the size of the divided data 910 is recorded. In the update time 705, the update time of the hash is recorded. In the reference count 706, the duplication count of the hash is recorded.

Figures 6, 7:
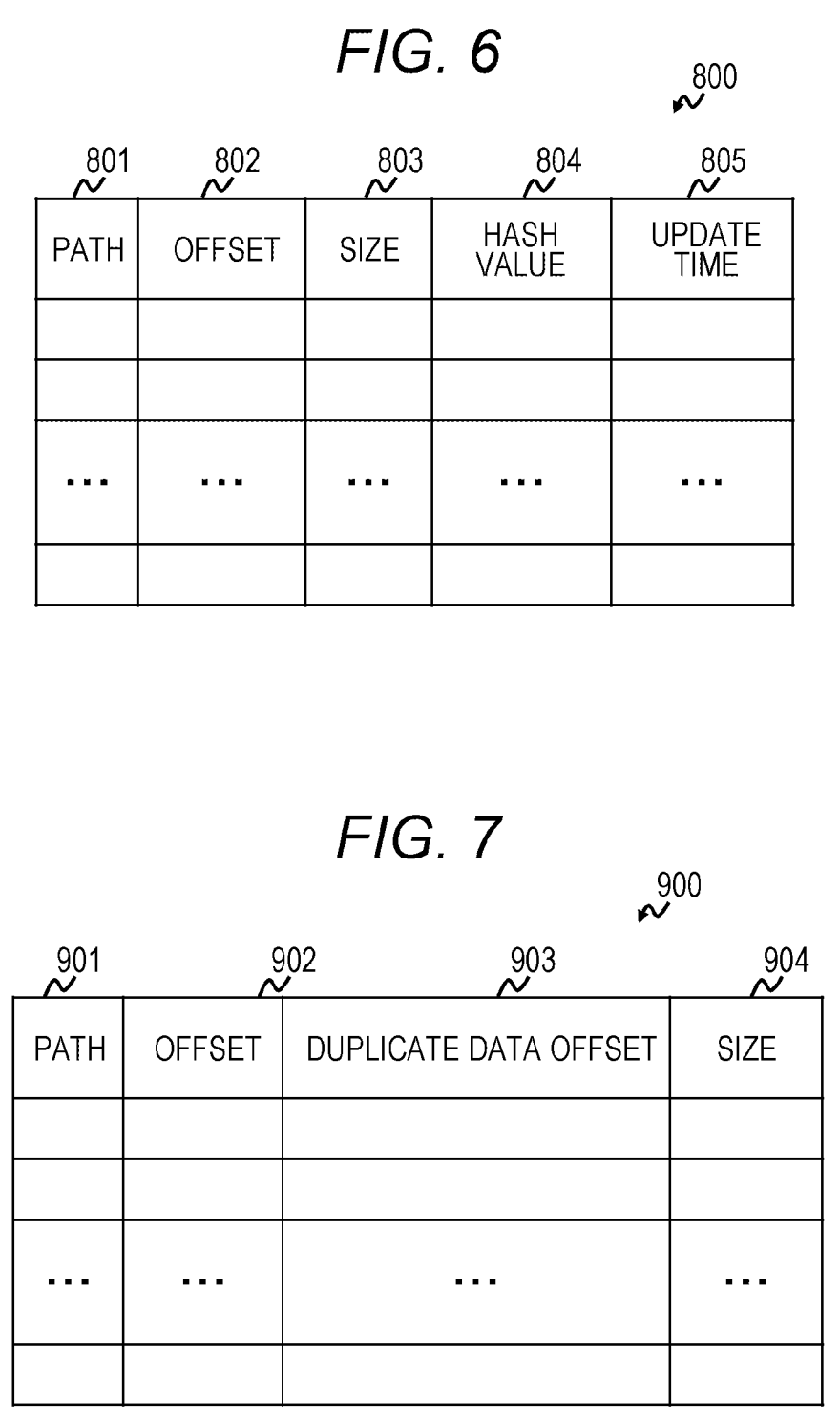

FIG. 6 is a diagram illustrating a configuration example of the in-memory non-duplication data list of FIG. 2.

In FIG. 6, the in-memory non-duplication data list 800 includes entries of a hash value 801, a path 802, a duplicate data offset 803, a size 804, and an update time 805.

In the hash value 801, the hash of the divided data 910 written in the file 900 on the disk 230 of FIG. 2 is recorded. In the path 802, the path on the disk 230 of the file 900 that stores the divided data 910 is recorded. Further, the path 802 may be omitted if the storage location of the duplicate data can be specified by the duplicate data offset 503. In the duplicate data offset 803, the offset value of the portion of the duplicated divided data 910 in the file 900 for storing the divided data 910 is recorded. In the size 804, the size of the divided data 910 is recorded. In the update time 805, the update time of the hash is recorded.

FIG. 7 is a diagram illustrating a configuration example of the file configuration management table of FIG. 2. In FIG. 7, the file configuration management table 920 manages information such as whether the divided data 910 of the file 900 is duplicate. The file configuration management table 920 includes entries of a path 901, an offset 902, a duplicate data offset 903, and a size 904.

In the path 901, the path on the disk 230 of the file 900 that stores the divided data 910 is recorded. Further, the path 901 may be omitted if the storage location of the duplicate data can be specified by the duplicate data offset 903. In the offset 902, the offset value of the portion that stores the divided data 910 in the file 900 storing the divided data 910 is recorded. In the duplicate data offset 903, the offset value of the portion of the file 900 that stores the divided data 910 storing the duplicated divided data 910 is recorded. In the size 904, the size of the divided data 910 is recorded.

Figure 8:
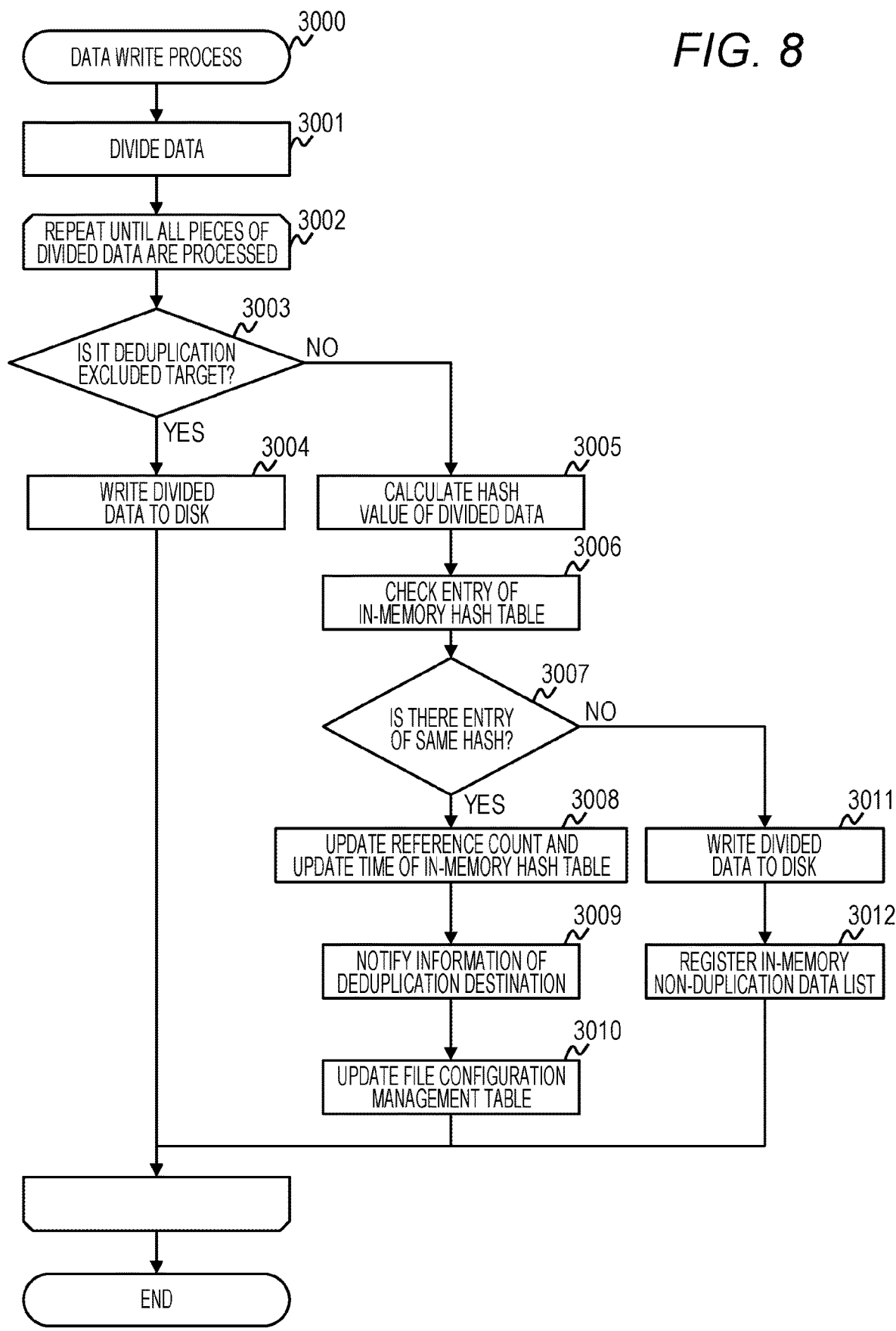
FIG. 8 is a flowchart illustrating a data writing process of a storage node of FIG. 2.

FIG. 8 is a flowchart illustrating a data writing process of the storage node of FIG. 2.

In FIG. 8, in a data writing process 3000, when there is a write request from the client server 100 of FIG. 2, the storage program 300 divides the file specified by the write request and generates divided data (3001).

Next, the storage program 300 determines whether all the divided data have been processed, and if all the divided data have been processed, the data writing process 3000 ends (3002). On the other hand, when all the divided data have not been processed, the storage program 300 refers to the deduplication setting table 600 in FIG. 4 and determines whether the divided data is a deduplication excluded target (3003). If the divided data is a deduplication excluded target, the storage program 300 writes the divided data to the disk 230 (3004) and returns to 3002.

On the other hand, if the divided data is a deduplication excluded target, the hash management program 400 calculates the hash value of the divided data (3005). Next, the hash management program 400 checks the entry in the in-memory hash table 500 (3006) and determines whether the hash value calculated in 3005 is registered in the in-memory hash table 500 (3007).

When the hash value calculated in 3005 is registered in the in-memory hash table 500, the hash management program 400 updates the reference count and the update time for the hash value calculated in 3005 in the in-memory hash table 500 (3008).

Next, the hash management program 400 notifies the storage program 300 of a deduplication destination for specifying a storage destination of the divided data having the hash value calculated in 3005 (3009). Next, the storage program 300 updates the file configuration management table 920 based on the deduplication destination notified in 3009 (3010) and returns to 3002.

On the other hand, when the hash value calculated in 3005 is not registered in the in-memory hash table 500, the storage program 300 writes the divided data to the disk 230 (3004).

Next, the hash management program 400 registers the hash value calculated in 3005 in the in-memory non-duplication data list 800, and returns to 3002.

Figure 9:
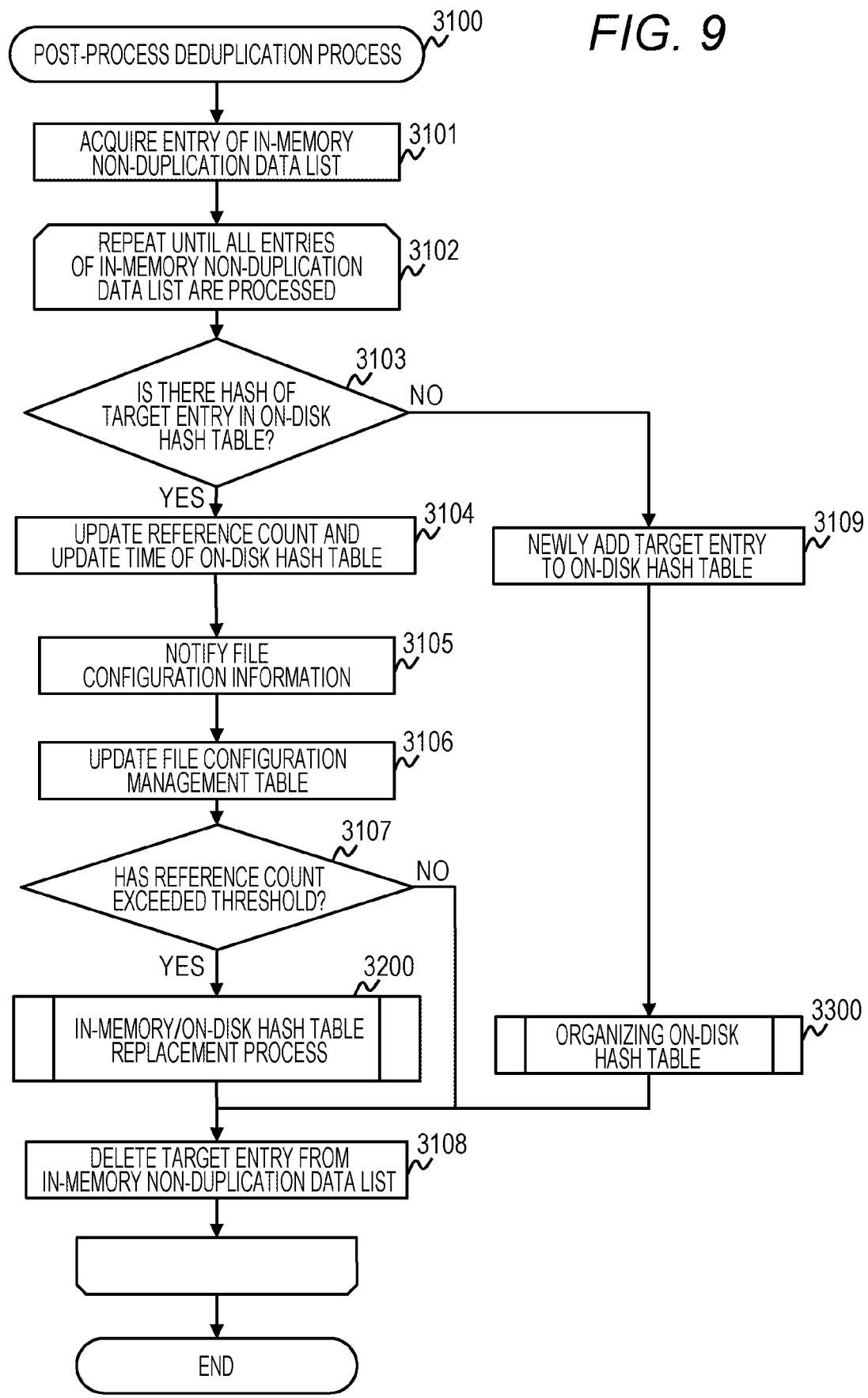
FIG. 9 is a flowchart illustrating a post-process deduplication process of the storage node of FIG. 2.

FIG. 9 is a flowchart illustrating a post-process deduplication process of the storage node of FIG. 2.

In FIG. 9, in the post-process deduplication process 3100, the hash management program 400 acquires the entry of the in-memory non-duplication data list 800 (3101).

Next, the hash management program 400 determines whether all the entries in the in-memory non-duplication data list 800 have been processed. When all the entries in the in-memory non-duplication data list 800 have been processed, the post-process deduplication process 3100 ends (3102). On the other hand, all the entries in the in-memory non-duplication data list 800 have not been processed, the hash management program 400 determines whether the hash of the target entry in the in-memory non-duplication data list 800 has been registered in the on-disk hash table 700 (3103).

When the hash of the target entry of the in-memory non-duplication data list 800 has not been registered in the on-disk hash table 700, the hash management program 400 adds the hash of the target entry of the in-memory non-duplication data list 800 to the on-disk hash table 700 (3109).

Next, the hash management program 400 deletes the target entry from the in-memory non-duplication data list 800 (3108) after performing the organizing process of the on-disk hash table 700 (3300), and returns to 3102.

On the other hand, when the hash of the target entry of the in-memory non-duplication data list 800 is registered in the on-disk hash table 700, the hash management program 400 updates the reference count and the update time for the hash value of the target entry in the on-disk hash table 700 (3104).

Next, the hash management program 400 notifies the storage program 300 of file configuration information (3105). Next, the storage program 300 updates the file configuration management table 920 based on the file configuration information notified in 3105 (3106). In updating the file configuration management table 920, the offset information of the file configuration information is replaced with the duplicate data offset information.

Next, the hash management program 400 determines whether the reference count of the on-disk hash table 700 has exceeded a threshold (3107). When the reference count of the on-disk hash table 700 has not exceeded the threshold, the hash management program 400 proceeds to 3108. When the reference count of the on-disk hash table 700 has exceeded the threshold, the in-memory/on-disk hash table replacement process is performed (3200), and the process proceeds to 3108.

Further, the in-memory/on-disk hash table replacement process of 3200 and the organizing process of the on-disk hash table 700 of 3300 do not necessarily have to be performed at the timing of FIG. 9, and may be performed asynchronously at another timing.

Figure 10:
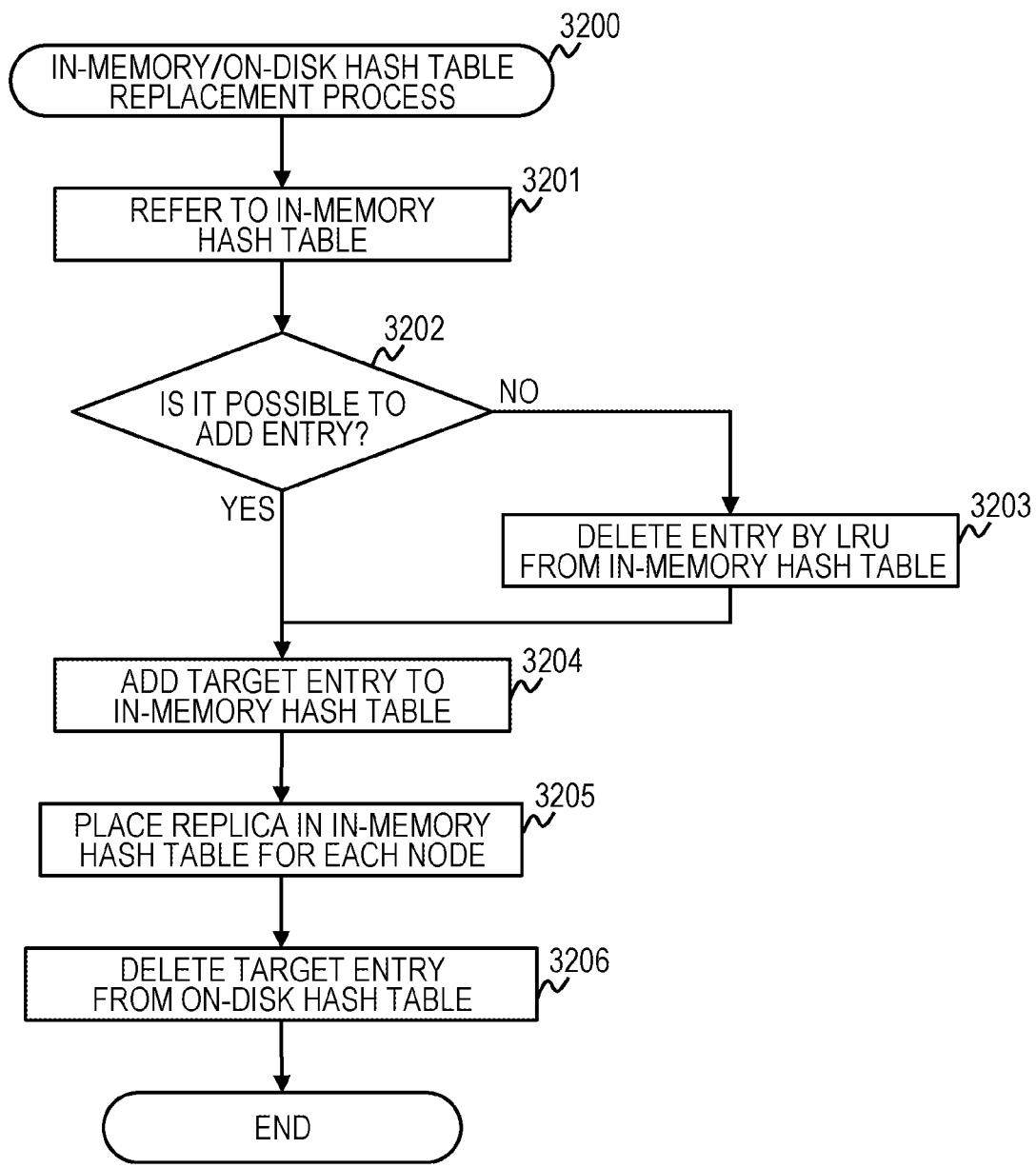
FIG. 10 is a flowchart illustrating an in-memory/on-disk hash table replacement process of the storage node of FIG. 2.

FIG. 10 is a flowchart illustrating an in-memory/on-disk hash table replacement process of the storage node of FIG. 2.

In FIG. 10, in the in-memory/on-disk hash table replacement process 3200, the hash management program 400 refers to the in-memory hash table 500 (3201) and determines whether an entry can be added to the in-memory hash table 500 (3202).

When an entry can be added to the in-memory hash table 500, the hash management program 400 adds an entry to the in-memory hash table 500 (3204) and moves the hash of the target entry of the on-disk hash table 700 to the in-memory hash table 500.

Next, when there are a plurality of storage nodes, the hash management program 400 places a replica in the in-memory hash table of each storage node for the entry added to the in-memory hash table 500 (3205). Further, the process of 3205 may be omitted. Next, the hash management program 400 deletes the target entry from the on-disk hash table 700 (3206).

On the other hand, when the entry cannot be added to the in-memory hash table 500, the hash management program 400 deletes the entry from the in-memory hash table 500 according to LRU (Least Recently Used) (3203), and the process proceeds to 3204. In the method of deleting entries from the in-memory hash table 500 according to LRU, the entries are deleted from the entry of the hash having the oldest update time in order.

Figure 11:
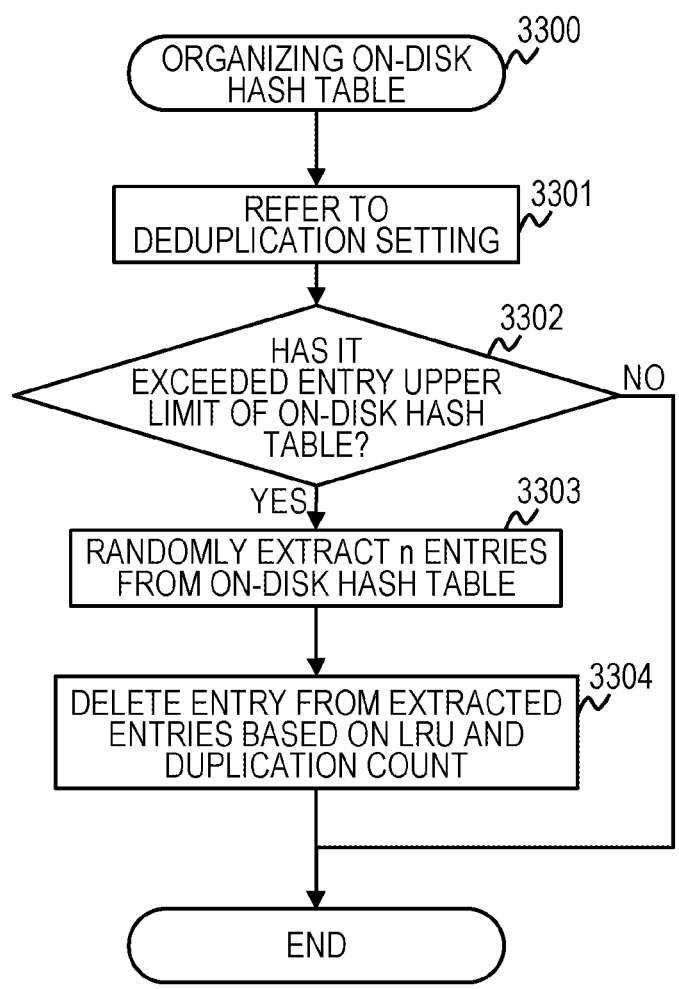
FIG. 11 is a flowchart illustrating an organizing process of the on-disk hash table of the storage node of FIG. 2.

FIG. 11 is a flowchart illustrating an organizing process of the on-disk hash table of the storage node of FIG. 2. In FIG. 11, in the organizing process 3300 of the on-disk hash table, the hash management program 400 refers to the deduplication setting table 600 in FIG. 4 (3301), and determines whether the number of entries in the on-disk hash table 700 has exceeded the entry upper limit 602 (3302). When the number of entries in the on-disk hash table 700 has not exceeded the entry upper limit 602, the hash management program 400 ends the organizing process 3300 of the on-disk hash table.

On the other hand, when the number of entries in the on-disk hash table 700 exceeds the entry upper limit 602, the hash management program 400 randomly extracts n (n is a positive integer) entries from the on-disk hash table 700 (3303). Then, the hash management program 400 deletes the entry from the on-disk hash table 700 based on the LRU and the duplication count of the entry extracted in 3303 (3304). At this time, the hash management program 400 deletes from the on-disk hash table 700, for example, an entry having a hash with the oldest update time and the small duplication count.

Further, the example of FIG. 11 illustrates a method of deleting an entry randomly extracted from the on-disk hash table 700 according to the LRU and the duplication count, but the extracted entry may be deleted from the on-disk hash table 700 according to the LRU.

Figure 12:
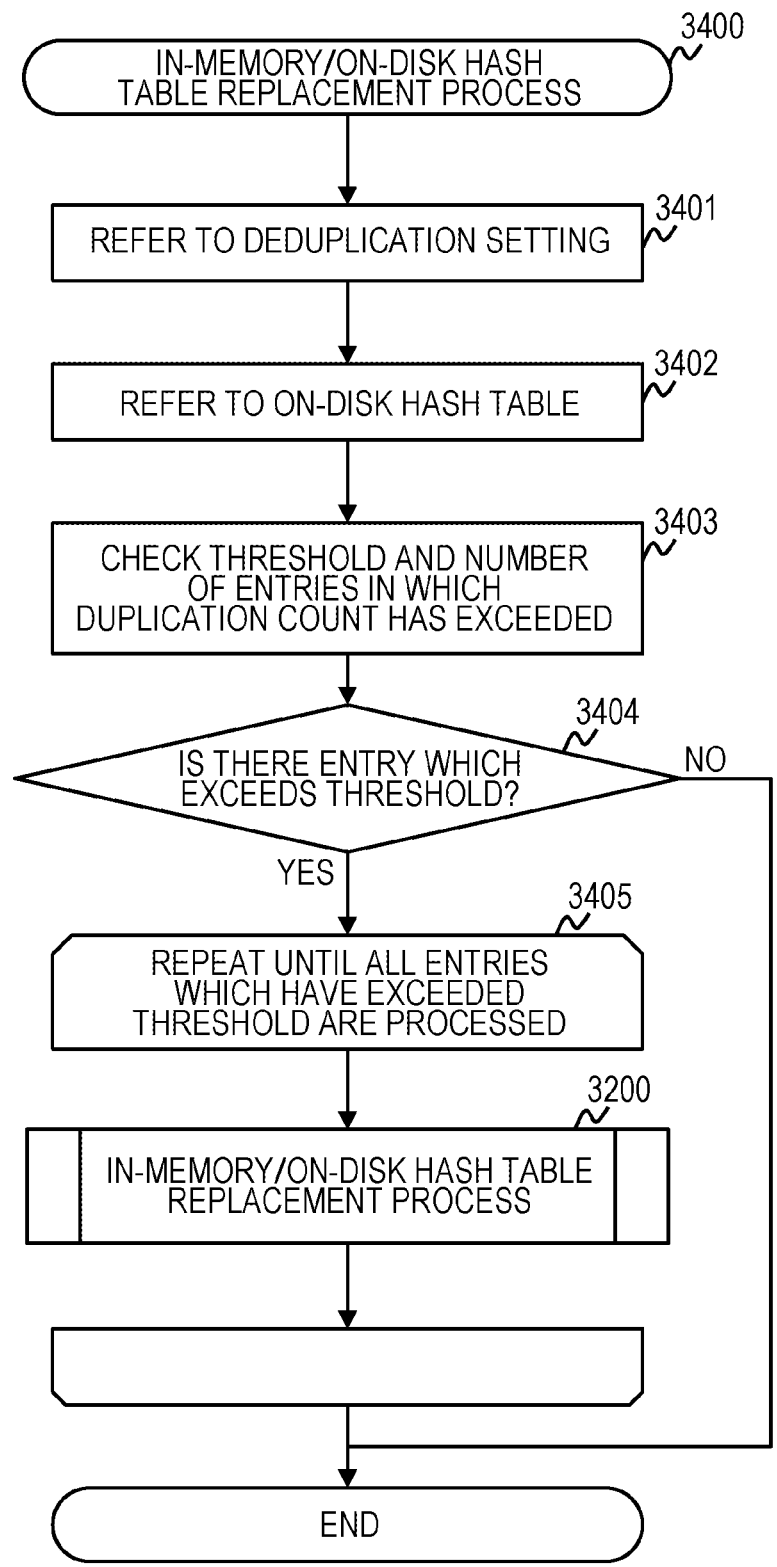
FIG. 12 is a flowchart illustrating an asynchronous in-memory/on-disk hash table replacement process of the storage node of FIG. 2.

FIG. 12 is a flowchart illustrating an asynchronous in-memory/on-disk hash table replacement process of the storage node of FIG. 2.

In FIG. 12, in the asynchronous in-memory/on-disk hash table replacement process 3400, the hash management program 400 refers to the deduplication setting table 600 of FIG. 4 and the on-disk hash table 700 of FIG. 5 (3401, 3402), and checks entries in which the duplication count of the hash in the on-disk hash table 700 has exceeded a threshold and the number thereof (3403).

Next, the hash management program 400 determines whether the entry in which the duplication count of the hash exceeds the threshold is registered in the on-disk hash table 700 (3404). When there is no entry whose duplication count exceeds the threshold, the hash management program 400 ends the asynchronous in-memory/on-disk hash table replacement process 3400.

On the other hand, when there is an entry whose duplication count exceeds the threshold, the hash management program 400 determines whether all the entries whose duplication count exceeds the threshold have been processed. When all the entries whose duplication count has exceeded the threshold have been processed, the asynchronous in-memory/on-disk hash table replacement process 3400 ends (3405). On the other hand, when all the entries whose duplication count exceeds the threshold have not been processed, the hash management program 400 executes the in-memory/on-disk hash table replacement process 3200 of FIG. 10, and returns to 3405.

Figure 13:
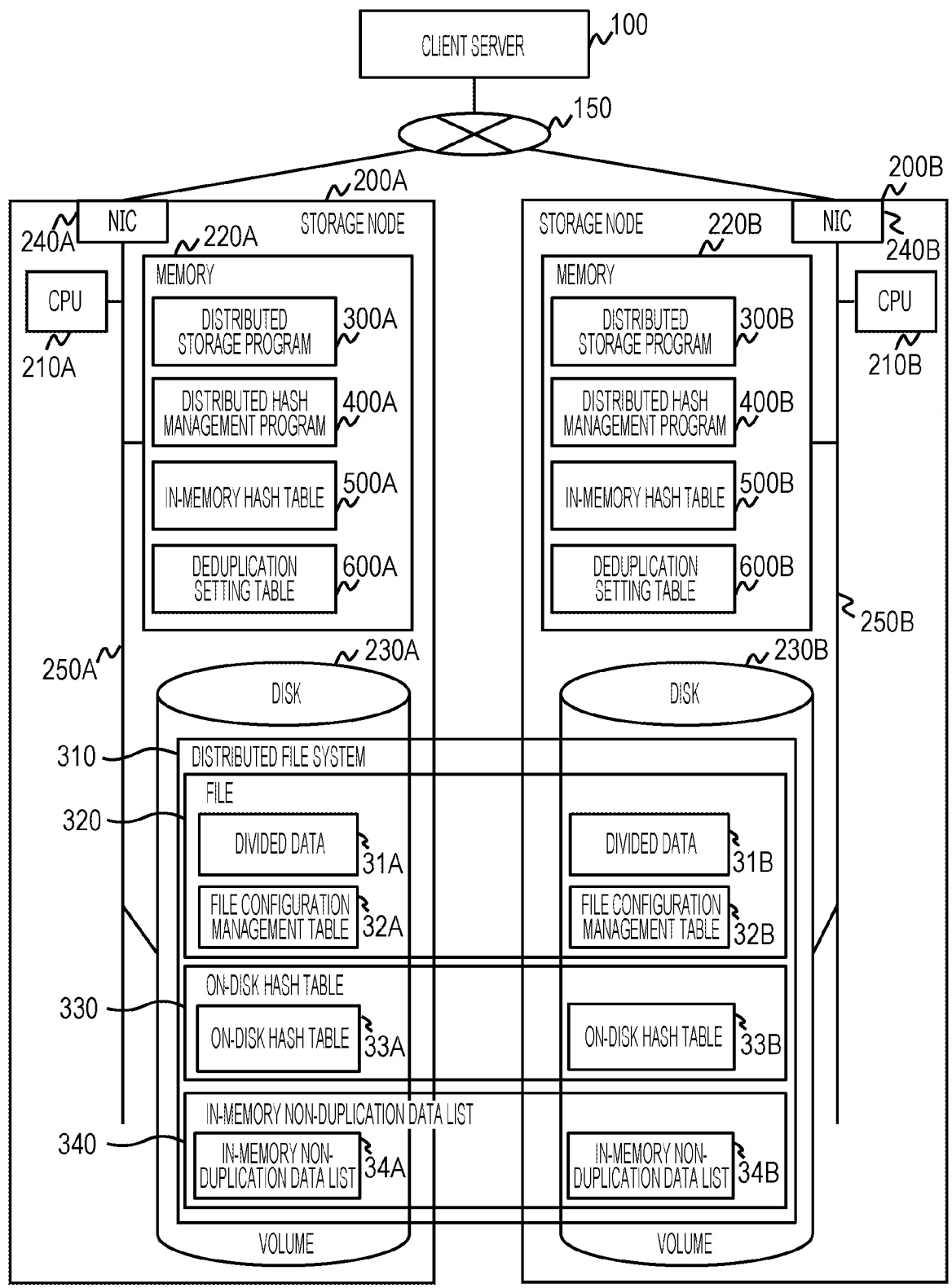
FIG. 13 is a block diagram illustrating an example of a hardware configuration of a storage system according to a second embodiment.

FIG. 13 is a block diagram illustrating an example of the hardware configuration of the storage system according to a second embodiment.

In FIG. 13, the storage system includes a client server 100 and storage nodes 200A and 200B. The client server 100 and the storage nodes 200A and 200B are connected via the network 150.

The storage nodes 200A and 200B include CPUs 210A and 210B, memories 220A and 220B, disks 230A and 230B, and NICs 240A and 240B, respectively. The CPU 210A, the memory 220A, the disk 230A, and the NIC 240A are connected to each other via the bus 250A, and the CPU 210B, the memory 220B, the disk 230B, and the NIC 240B are connected to each other via the bus 250B.

The memories 220A and 220B hold distributed storage programs 300A and 300B, distributed hash management programs 400A and 400B, in-memory hash tables 500A and 500B, and deduplication setting tables 600A and 600B, respectively. The in-memory hash tables 500A and 500B may be held in common by the storage nodes 200A and 200B, or may be held separately in the storage nodes 200A and 200B. When the storage nodes 200A and 200B are separately held, the replicas of the in-memory hash tables 500A and 500B may be synchronously held.

The distributed storage programs 300A and 300B manage a file 320 that is distributed and stored in the disks 230A and 230B, respectively. The distributed storage programs 300A and 300B operate in cooperation with each other to form a distributed storage. The distributed storage establishes a distributed file system 310 across a plurality of volumes on the disks 230A and 230B. The file 320 on the distributed file system 310 is divided into divided data 31A and 31B, and distributed and disposed in the volumes allocated to the storage nodes 200A and 200B.

The distributed hash management programs 400A and 400B manage the in-memory hash tables 500A and 500B, and an in-memory non-duplication data list 340 and an on-disk hash table 330, respectively.

The in-memory hash tables 500A and 500B register the hashes of the divided data 31A and 31B stored in the disks 230A and 230B, the duplication counts of the hashes, and the update times of the hashes, respectively. The deduplication setting tables 600A and 600B set the values used for updating the in-memory hash tables 500A and 500B and the on-disk hash table 330, respectively.

The disks 230A and 230B hold the on-disk hash table 330, the in-memory non-duplication data list 340, and the file 320. The file 320 is divided into the divided data 31A and 31B, and the disks 230A and 230B hold file configuration management tables 32A and 32B for the divided data 31A and 31B, respectively. The on-disk hash table 330 may be held on the distributed file system 310, or the disks 230A and 230B may individually hold on-disk hash tables 33A and 33B, respectively. The in-memory non-duplication data list 340 may be held on the distributed file system 310, or the disks 230A and 230B may individually hold in-memory non-duplication data list 34A and 34B, respectively.

The on-disk hash table 330 registers the hashes of the divided data 31A and 31B stored in the disks 230A and 230B, the duplication counts of the hashes, and the update times of the hashes. The in-memory non-duplication data list 340 registers the hashes of the divided data 31A and 31B stored in the disks 230A and 230B, and the update times of the hashes. The file configuration management tables 32A and 32B manage the configuration of the divided data 31A and 31B, respectively.

The CPUs 210A and 210B read the distributed storage programs 300A and 300B and the distributed hash management programs 400A and 400B on the memories 220A and 220B, respectively, and execute each program.

Upon receiving the write request from the client server 100, the CPUs 210A and 210B generate the divided data obtained by dividing the file, calculate the hash of each divided data, and compare the hash with the hash registered in the in-memory hash tables 500A and 500B. Then, if the hash of the divided data at this time is not duplicate with the hash registered in the in-memory hash tables 500A and 500B, the CPUs 210A and 210B register the hash of the divided data at this time in the in-memory non-duplication data list 340.

Further, the CPUs 210A and 210B each execute the following process asynchronously with the above process.

That is, the CPUs 210A and 210B compare the hash registered in the in-memory non-duplication data list 340 with the hash registered in the on-disk hash table 330. When the hash registered in the in-memory non-duplication data list 340 is duplicate with the hash registered in the on-disk hash table 330, the duplication count of the duplicated hash registered in the on-disk hash table 330 is increased by 1, and the update time of the hash is updated to the latest value.

Then, when the duplication count of the hash registered in the on-disk hash table 330 exceeds the threshold, the CPUs 210A and 210B each move the hash, which is registered in the on-disk hash table 330 and in which the duplication count has exceeded the threshold, from the on-disk hash table 330 to the in-memory hash tables 500A and 500B, and update the update time of the hash to the latest value.

On the other hand, when the hash registered in the in-memory non-duplication data list 340 is not duplicate with the hash registered in the on-disk hash table 330, the CPUs 210A and 210B move the hash, which is not duplicate with the hash registered in the on-disk hash table 330, from the in-memory non-duplication data list 340 to the on-disk hash table 330.

This prevents the in-memory hash tables 500A and 500B from being filled with new hashes even when the file 320 is placed on the distributed file system 310, and it is possible to leave the hashes that are highly likely to be duplicated in the future in the in-memory hash tables 500A and 500B, and it is possible suppress a decrease in the deduplication rate while coping with the restriction of the capacities of the memories 220A and 220B.

Figure 14:
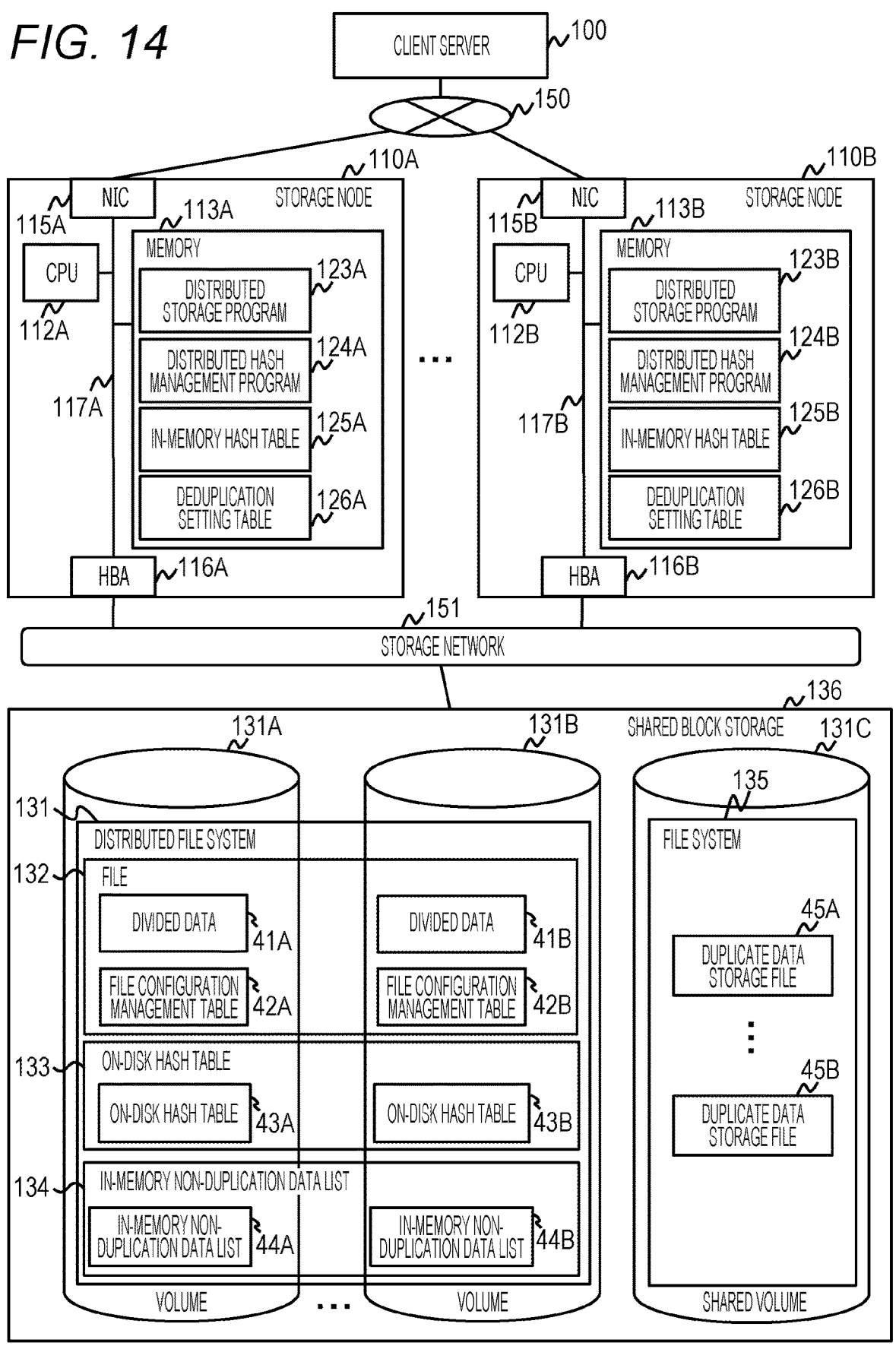
FIG. 14 is a block diagram illustrating an example of a hardware configuration of the storage system according to a third embodiment.

FIG. 14 is a block diagram illustrating an example of the hardware configuration of the storage system according to a third embodiment.

In FIG. 14, the storage system includes the client server 100, storage nodes 110A and 110B, and a shared block storage 136. The client server 100 and the storage nodes 110A and 110B are connected via the network 150. The storage nodes 110A and 110B and the shared block storage 136 are connected via a storage network 151.

The storage nodes 110A and 110B include CPUs 112A and 112B, memories 113A and 113B, NICs 115A and 115B, and HBAs (Host Bus Adapters) 116A and 116B, respectively. The CPU 112A, the memory 113A, the NIC 115A, and the HBA 116A are connected to each other via a bus 117A, and the CPU 112B, the memory 113B, the NIC 115B, and the HBA 116B are connected to each other via a bus 118B.

The memories 113A and 113B hold distributed storage programs 123A and 123B, distributed hash management programs 124A and 124B, in-memory hash tables 125A and 125B, and deduplication setting tables 126A and 126B, respectively. The in-memory hash tables 125A and 125B may be held in common by the storage nodes 110A and 110B, or may be held separately in the storage nodes 110A and 110B.

The distributed storage programs 123A and 123B operate in cooperation with each other to form a distributed storage. The distributed storage establishes a distributed file system 131 across a plurality of volumes 131A and 131B on the shared block storage 136. The file 132 on the distributed file system 131 is divided into divided data 41A and 41B, and distributed and arranged in the volumes 131A and 131B allocated to the respective storage nodes 110A and 110B.

Also, the distributed storage establishes a file system 135 on a shared volume 131C. The file system 135 holds duplicate data storage files 45A and 45B. Then, the distributed storage stores the duplicate data, which is duplicated in the distributed file system 131, in the duplicate data storage files 45A and 45B on the file system 135. A plurality of duplicate data storage files 45A and 45B are created and allocated to the respective storage nodes 110A and 110B.

The distributed hash management programs 124A and 124B manage the in-memory hash tables 125A and 125B, an in-memory non-duplication data list 134, and an on-disk hash table 133, respectively.

The in-memory hash tables 125A and 125B register the hashes of the divided data 41A and 41B stored in volumes 131A and 131B, the duplication counts of the hashes, and the update times of the hashes, respectively. The deduplication setting tables 126A and 126B set values used for updating the in-memory hash tables 125A and 125B and the on-disk hash table 133, respectively.

The shared block storage 136 is shared by the plurality of storage nodes 110A and 110B. The shared block storage 136 includes the shared volume 131C that stores duplicate data. Both the storage nodes 110A and 110B can access the shared volume 131C. Here, the volumes 131A and 131B on the shared block storage 136 are allocated as storage devices for storing the data of the storage nodes 110A and 110B. The shared volume 131C on the shared block storage 136 is allocated as a storage device that shares data by the storage nodes 110A and 110B. The storage nodes 110A and 110B execute deduplication processing on the duplicate data that is duplicated between the storage nodes 110A and 110B, and store the duplicate data in the shared volume 131C on the shared block storage 136.

Here, each of the storage nodes 110A and 110B can read the duplicate data requested to be read by the client server 100 from the shared volume 131C. Therefore, each of the storage nodes 110A and 110B can reduce the number of times of inter-node communication for reading the duplicate data even when the own node does not hold the duplicate data requested to be read from the client server 100.

Each of the volumes 131A and 131B holds the on-disk hash table 133, the in-memory non-duplication data list 134, and the file 132. The file 132 is divided into the divided data 41A and 41B, and the volumes 131A and 131B hold file configuration management tables 42A and 42B for the divided data 41A and 41B, respectively. The on-disk hash table 133 may be held on the distributed file system 131, or the volumes 131A and 131B may individually hold on-disk hash tables 43A and 43B. The in-memory non-duplication data list 134 may be held on the distributed file system 131, or the volumes 131A and 131B may individually hold the in-memory non-duplication data lists 44A and 44B, respectively.

The on-disk hash table 133 registers the hashes of the divided data 41A and 41B stored in the volumes 131A and 131B, the duplication counts of the hashes, and the update times of the hashes. The in-memory non-duplication data list 134 registers the hashes of the divided data 41A and 41B stored in the respective volumes 131A and 131B and the update times of the hashes.

The file configuration management tables 42A and 42B manages the configuration of the divided data 41A and 41B on the distributed file system 131. The file configuration management tables 42A and 42B manage access information for accessing the duplicate data stored in the duplicate data storage files 45A and 45B. As the access information, the path on the file system 135 of the duplicate data storage files 45A and 45B storing the duplicate data, the offset value of the head of the portion for storing the duplicate data in the duplicate data storage files 45A and 45B, and the size of the duplicate data are recorded in the file configuration management tables 42A and 42B.

The CPUs 112A and 112B read the distributed storage programs 123A and 123B and the distributed hash management programs 124A and 124B onto the memories 113A and 113B, respectively, and execute the programs. The CPUs 112A and 112B each can send/receive data with respect to the shared block storage 136 via the storage network 151. At this time, the CPUs 112A and 112B can read/write data with respect to the volumes 131A and 131B on the shared block storage 136 and the shared volume 131C.

Upon receiving the write request from the client server 100, the CPUs 112A and 112B generate the divided data obtained by dividing the file, calculate the hash of each divided data, and compare the hash with the hash registered in each of the in-memory hash tables 125A and 125B. Then, if the hash of the divided data at this time is not duplicate with the hash registered in the in-memory hash tables 125A and 125B, the CPUs 112A and 112B register the hash of the divided data at this time in the in-memory non-duplication data list 134.

Further, the CPUs 112A and 112B each execute the following process asynchronously with the above process. That is, the CPUs 112A and 112B compare the hash registered in the in-memory non-duplication data list 134 with the hash registered in the on-disk hash table 133. When the hash registered in the in-memory non-duplication data list 134 is duplicate with the hash registered in the on-disk hash table 133, the duplication count of the duplicated hash registered in the on-disk hash table 133 is increased by 1, and the update time of the hash is updated to the latest value.

Then, when the duplication count of the hash registered in the on-disk hash table 133 exceeds the threshold, the CPUs 112A and 112B each move the hash, which is registered in the on-disk hash table 133 and in which the duplication count has exceeded the threshold, from the on-disk hash table 133 to the in-memory hash tables 125A and 125B, and update the update time of the hash to the latest value.

On the other hand, when the hash registered in the in-memory non-duplication data list 134 is not duplicate with the hash registered in the on-disk hash table 133, the CPUs 112A and 112B move the hash, which is not duplicate with the hash registered in the on-disk hash table 133, from the in-memory non-duplication data list 134 to the on-disk hash table 133.

This prevents the in-memory hash tables 125A and 125B from being filled with new hashes even when the file 132 is placed on the distributed file system 131, and it is possible to leave the hashes that are highly likely to be duplicated in the future in the in-memory hash tables 125A and 125B, and it is possible suppress a decrease in the deduplication rate while coping with the restriction of the capacities of the memories 113A and 113B.

Figure 15:
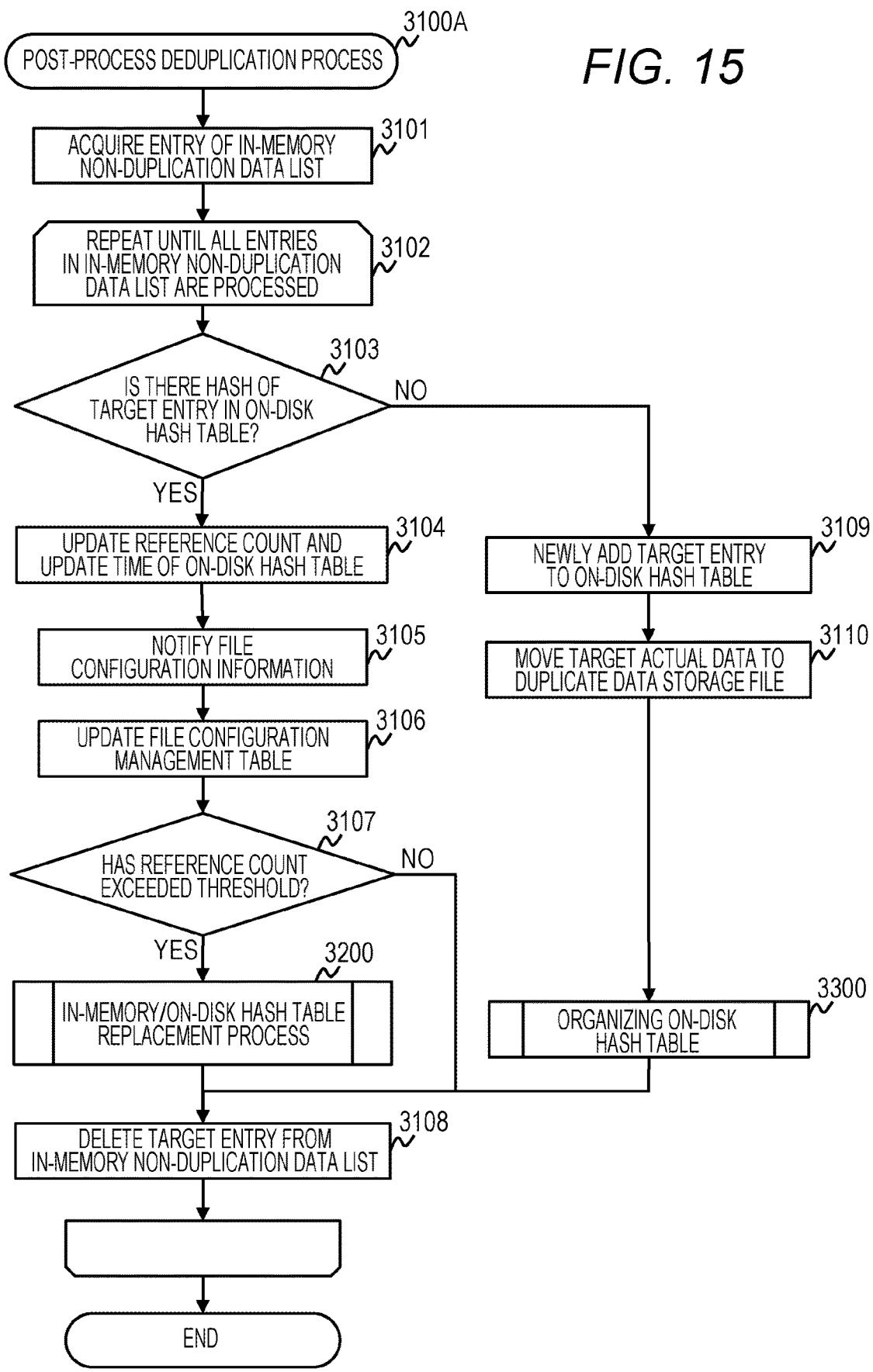
FIG. 15 is a flowchart illustrating a post-process deduplication process of the storage node of FIG. 14.

FIG. 15 is a flowchart illustrating the post-process deduplication process of the storage node of FIG. 14. In the post-process deduplication process 3100A of FIG. 15, 3110 is added between 3109 and 3300 of the post-process deduplication process 3100 of FIG. 10. In 3110, the distributed hash management programs 124A and 124B each move the target actual data from the distributed file system 131 of FIG. 14 to the duplicate data storage files 45A and 45B.

Figure 16:
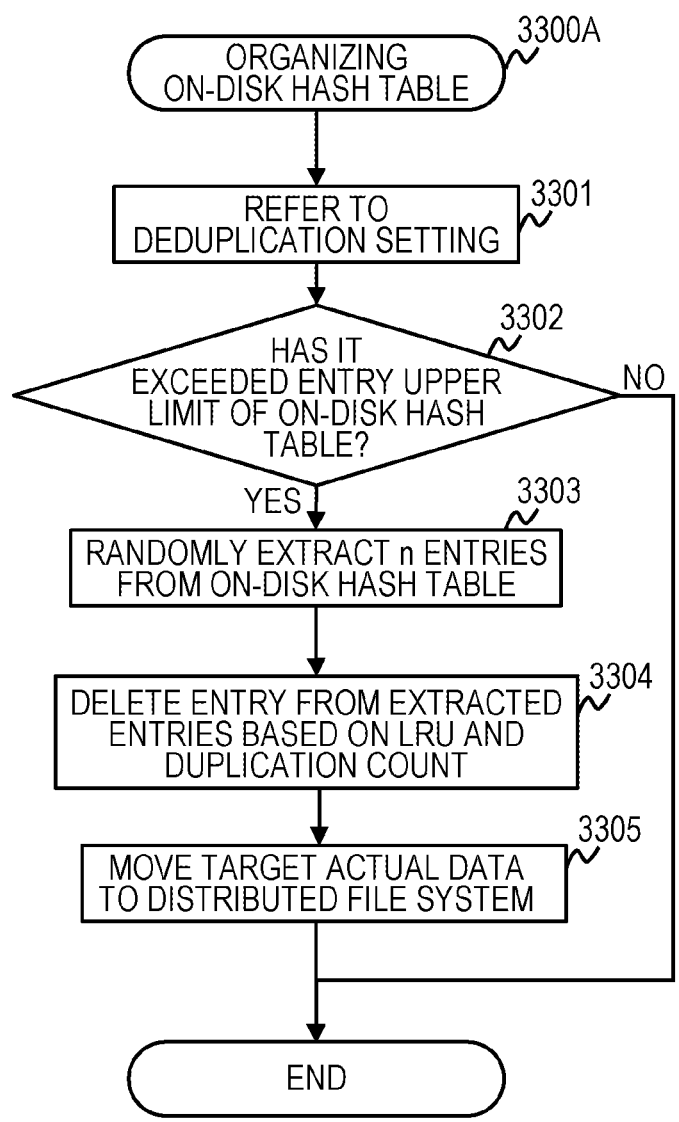
FIG. 16 is a flowchart illustrating an organizing process of the on-disk hash table of the storage node of FIG. 14.

FIG. 16 is a flowchart illustrating the organizing process of the on-disk hash table of the storage node of FIG. 14. In the organizing process 3300A of the on-disk hash table of FIG. 16, 3305 is added after 3304 of the organizing process 3300 of the on-disk hash table of FIG. 11. In 3305, the distributed hash management programs 124A and 124B each move the target actual data from the duplicate data storage files 45A and 45B of FIG. 14 to the distributed file system 131.

Further, the invention is not limited to the above embodiments, but various modifications may be contained. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations. Each of the above configurations, functions, processing units, processing means, and the like may be partially or entirely achieved by hardware by, for example, designing by an integrated circuit.

What is claimed is:
1. A storage system, comprising:
   a processor;
   a drive that stores data, wherein the drive holds an on-disk hash table and an in-memory non-duplication data list; and a memory that is capable of inputting and outputting faster than the drive, wherein the memory holds an in-memory hash table, wherein the storage system has a deduplication function of deduplicating a plurality of pieces of the same data determined to be duplicated in duplication determination to store the data in the drive, wherein hashes calculated from the data are compared, and the pieces of data whose hashes are matched are compared to perform the duplication determination, wherein the hashes calculated from the data are stored at least in any one of the memory and the drive using both storage areas of the memory and the drive, wherein a hash of data for the duplication determination is compared with a plurality of hashes stored in the memory and/or the drive, and wherein the hash is moved between the memory and the drive based on the number of times that the hashes are matched in the duplication determination, wherein a hash of which the number of matching times is large is moved to the memory, and a hash of which the number of matching times is less is moved to the drive, wherein the hash is moved from the memory based on free capacity in the memory for storing the hash, and wherein the processor is configured to
register a hash of data held by the drive, a duplication count of the hash, and an update time when the hash is updated lastly to the in-memory hash table and the on-disk hash table, register the hash of the data held by the drive and the update time of the hash in the in-memory non-duplication data list, register a hash which is not duplicate with the hash registered in the in-memory hash table to the in-memory non-duplication data list, when the hash registered in the in-memory non-duplication data list is duplicate with the hash registered in the on-disk hash table, increase a duplication count of the duplicate hash registered in the on-disk hash table and update the update time of the hash, when the duplication count of the hash registered in the on-disk hash table exceeds a threshold, move the hash of which the duplication count registered in the on-disk hash table exceeds the threshold from the on-disk hash table to the in-memory hash table and update the update time of the hash, and when the hash registered in the in-memory non-duplication data list is not duplicate with the hash registered in the on-disk hash table, move the hash which is not duplicate with the hash registered in the on-disk hash table from the in-memory non-duplication data list to the on-disk hash table.

2. The storage system according to claim 1,
wherein, in the duplication determination, when matched hashes are not found in the memory and the drive, the hash of the data for the duplication determination is stored in the memory, and wherein the hash is moved from the memory to the drive based on time after the hash is stored in the memory.

3. The storage system according to claim 1, wherein, when a capacity of the on-disk hash table held by the drive exceeds a limit, the processor deletes entries from an entry having a hash with an oldest update time in order.

4. The storage system according to claim 1, comprising:
a plurality of storage nodes each having the processor, the memory, and the drive, wherein the plurality of storage nodes establish a distributed file system across volumes on the drive, and wherein each of the storage nodes holds a replica of the in-memory hash table.

5. The storage system according to claim 4, comprising:
a shared drive which is shared by the plurality of storage nodes, wherein the shared drive includes a shared volume that stores duplicate data that is duplicated among the storage nodes, and wherein the shared volume is accessible from the plurality of storage nodes.

6. A duplicate data management method of a storage system that includes a processor, a drive for storing data that holds an on-disk hash table and an in-memory non-duplication data list, and a memory capable of inputting and outputting faster than the drive and holding an in-memory hash table, and has a deduplication function of deduplicating a plurality of pieces of the same data determined to be duplicated in duplication determination to store the data in the drive, the method comprising:

comparing hashes calculated from the data, and comparing the pieces of data whose hashes are matched to perform the duplication determination;

storing the hashes calculated from the data at least in any one of the memory and the drive using both storage areas of the memory and the drive;

comparing a hash of data for the duplication determination with a plurality of hashes stored in the memory and/or the drive;

moving the hash between the memory and the drive based on the number of times that the hashes are matched in the duplication determination, wherein a hash of which the number of matching times is large is moved to the memory, and a hash of which the number of matching times is less is moved to the drive, and wherein the hash is moved from the memory based on free capacity in the memory for storing the hash;

registering a hash of data held by the drive, a duplication count of the hash, and an update time when the hash is updated lastly to the in-memory hash table and the on-disk hash table;

registering the hash of the data held by the drive and the update time of the hash in the in-memory non-duplication data list;

registering a hash which is not duplicate with the hash registered in the in-memory hash table to the in-memory non-duplication data list;

when the hash registered in the in-memory non-duplication data list is duplicate with the hash registered in the on-disk hash table, increasing a duplication count of the duplicate hash registered in the on-disk hash table and updating the update time of the hash;

when the duplication count of the hash registered in the on-disk hash table exceeds a threshold, moving the hash of which the duplication count registered in the on-disk hash table exceeds the threshold from the on-disk hash table to the in-memory hash table and updating the update time of the hash; and when the hash registered in the in-memory non-duplication data list is not duplicate with the hash registered in the on-disk hash table, moving the hash which is not duplicate with the hash registered in the on-disk hash table from the in-memory non-duplication data list to the on-disk hash table.

* * * * *